US007050899B2

(12) United States Patent
Masters et al.

(10) Patent No.: US 7,050,899 B2
(45) Date of Patent: May 23, 2006

(54) SLEW RATE REVLIMITER

(75) Inventors: Stephen C. Masters, El Paso, TX (US); Douglas B. Waits, El Paso, TX (US)

(73) Assignee: Autotronic Controls Corporation, El Paso, TX (US)

( * ) Notice: Subject to any disclaimer, the term of this patent is extended or adjusted under 35 U.S.C. 154(b) by 70 days.

(21) Appl. No.: 10/808,038

(22) Filed: Mar. 24, 2004

(65) Prior Publication Data

US 2005/0216132 A1 Sep. 29, 2005

(51) Int. Cl.
*G06F 7/00* (2006.01)

(52) U.S. Cl. ......................... 701/84; 701/110; 180/197

(58) Field of Classification Search .................. 701/84, 701/110, 86, 112, 115; 180/197; 123/406.6, 123/406.64, 406.65

See application file for complete search history.

(56) References Cited

U.S. PATENT DOCUMENTS 4,596,215 A * 6/1986 Palesotti ..................... 123/335
4,873,891 A * 10/1989 Guanciale .................... 74/625
5,473,544 A 12/1995 Yamashita
5,803,043 A * 9/1998 Bayron et al. .............. 123/335
6,141,618 A 10/2000 Yamashita et al.
6,182,002 B1 1/2001 Bauerle et al.
6,304,814 B1 * 10/2001 Masters et al. ............. 701/110
6,339,743 B1 * 1/2002 Young et al. ............... 701/115
6,577,944 B1 6/2003 Davis
6,615,126 B1 9/2003 Potter et al.

* cited by examiner

*Primary Examiner*—Michael J. Zanelli
(74) *Attorney, Agent, or Firm*—Fitch, Even, Tabin & Flannery

(57) ABSTRACT

A engine control device is disclosed for monitoring and controlling the RPM of an engine. The device restricts the over-revving of an engine due to a lack of resistance by monitoring the RPM and determining whether measured RPM indicate a likely lack of resistance causing over-revving of an engine, such as would occur if the tires are slipping relative to the road. The revlimiter may monitor the revolutions per minute of a crankshaft of an engine and, upon certain conditions, may slow the engine when the RPM exceed certain parameters. The revlimiter may slow the engine if the RPM of the crankshaft exceed a target RPM value. The programming of the device may be gear specific. In this manner, the revlimiter serves to prevent engine over-revving and serves as a form of traction control.

30 Claims, 4 Drawing Sheets

SLEW RATE REVLIMITER

FIELD OF THE INVENTION

The invention relates to an ignition control device for a vehicle, and particularly to an ignition control device for allowing maximum acceleration of the vehicle, and for reducing the likelihood of engine over-rev.

BACKGROUND OF THE INVENTION

It is well-known in the art for vehicles to employ electronic devices to control the vehicle's ignition system. A typical production passenger vehicle often includes such a device which performs such a function along with other engine or vehicle control functions.

For instance, it is known to employ electronic devices that monitor the amount of acceleration or rotation of each individual wheel. When the tires are found not to be rotating in proper relative velocity or acceleration, the device directs power to be shifted from one wheel or axle to a different wheel or axle. Such a device is often referred to as a traction control device. Often, the improper relative velocity or acceleration among tires or axles is a likely indicator of a wheel slipping, a condition which causes a lack of control in operating the vehicle.

In addition, slippage prevents a vehicle from accelerating at maximum power. As is known, a static friction coefficient is higher than a sliding friction coefficient. When a wheel slips under power, the friction between the wheel and the roadway changes from static friction to sliding friction. Accordingly, the wheel begins to spin and slide against the road, and a portion of the acceleration power is lost.

In some instances, it is important to provide maximum power possible to a wheel under non-slip conditions. For example, when a vehicle is trying to climb a hill during adverse weather conditions, such as snow or other precipitation, it is critical that the vehicle not lose traction between the vehicle's tires and the surface of the road.

Another example is in racing, and, in particular, drag racing. Drag racing typically involves directing a vehicle down a generally straight track where a pair of cars race side-by-side, such as over a quarter-mile length. In the event the track conditions are less than ideal, the tires of the vehicle may start to slip if maximum power is delivered from the engine to the tires. A driver has to be able to sense slippage and back off from the accelerator. Once the tires have regained traction, the driver may then re-apply full acceleration.

The problem with relying on the driver is that the driver must first sense the slippage, and must be able to release the accelerator the proper amount for the proper time. Winning drag race times are measured in thousandths of a second, or less. The vehicles may travel a quarter mile in under eight seconds, and may reach speeds in the order of 300 mph. Therefore, a single slip condition may be the difference between winning or losing a race. It also should be recognized that, by mere luck, one driver in a two-vehicle race may draw an inferior track lane. Such a draw, alone, can determine winning and losing in drag racing.

However, the difficulty of reacting quickly to a slip condition that is presented to a driver in a drag race is not nearly as important as over-revving of the engine. In a typical drag race, the roadway is exposed to weather year round, can only be built within certain tolerances, and is, therefore, imperfect in and of itself. Some drag racing engines may rotate in the range of 12,500 revolutions per minute (RPM). When the vehicle's tires lose traction with the road, the lack of resistance frees the engine of the vehicle to excessively race or accelerate. Not only can this damage the engine and the vehicle, it can imperil the driver or bystanders if the engine should fail catastrophically, such as with an explosion.

In addition, engine over-revving may result from other factors than the described slip condition. Specifically, over-revving of the engine is, in many instances, due to a lack of resistance from the engine to the drive train. As stated, this may be because the tires have lost traction with the track surface. In addition, the lack of resistance may result from the engine becoming, in essence, disconnected from the drivetrain due to a slipping or blown clutch. A similar event occurs when the driver misses a gear and fails to re-engage the clutch before fully opening the throttle. Furthermore, the drivetrain itself may fail by having a component failure or the transmission blowing.

Accordingly, there has been a need for a device that minimizes the effects of slippage between a tire or wheel and a roadway or racetrack and that minimizes the likelihood of over-revving of an engine.

SUMMARY OF THE INVENTION

In accordance with one aspect of the present invention, a revlimiter is provided. The revlimiter monitors the revolutions per minute of a crankshaft of an engine and, upon certain conditions, slows the engine when the rotational speed of the crankshaft, or RPM, exceed certain parameters. For instance, the revlimiter may slow the engine because the RPM of the crankshaft exceed a predetermined value for a time from when the vehicle began to move, or exceed a predetermined plotted value, such as for a particular gear. In this manner, the revlimiter serves to prevent engine over-revving and serves as a form of traction control.

In accordance with a further aspect of the present invention, a method for optimizing power delivery from an engine is provided. The method may include providing a maximum allowable revolutions per minute rate for each time from a reference, comparing the revolutions per minute of the engine to the maximum allowable revolutions per minute rate for a particular time, and decreasing power from the engine to the tires when the revolutions per minute of the engine exceed the provided maximum allowable revolutions per minute rate for the particular time.

DESCRIPTION OF THE PREFERRED EMBODIMENTS

In one form of the present invention, an electronic ignition device is provided for controlling the firing of an engine. Although the ignition device may be used for any motorized vehicle, the ignition device is preferably used in a racing car, and more preferably used in a drag racing vehicle. In the depicted embodiments, the ignition device is in the form of a programmable revlimiter 10 that limits over-revving of the engine due to a lack of resistance on the engine resulting from, for instance, a slip condition between the tires of the vehicle and the surface on which the vehicle is driving, a slipping clutch or out-of-gear transmission, or broken drivetrain component.

Figure 1:
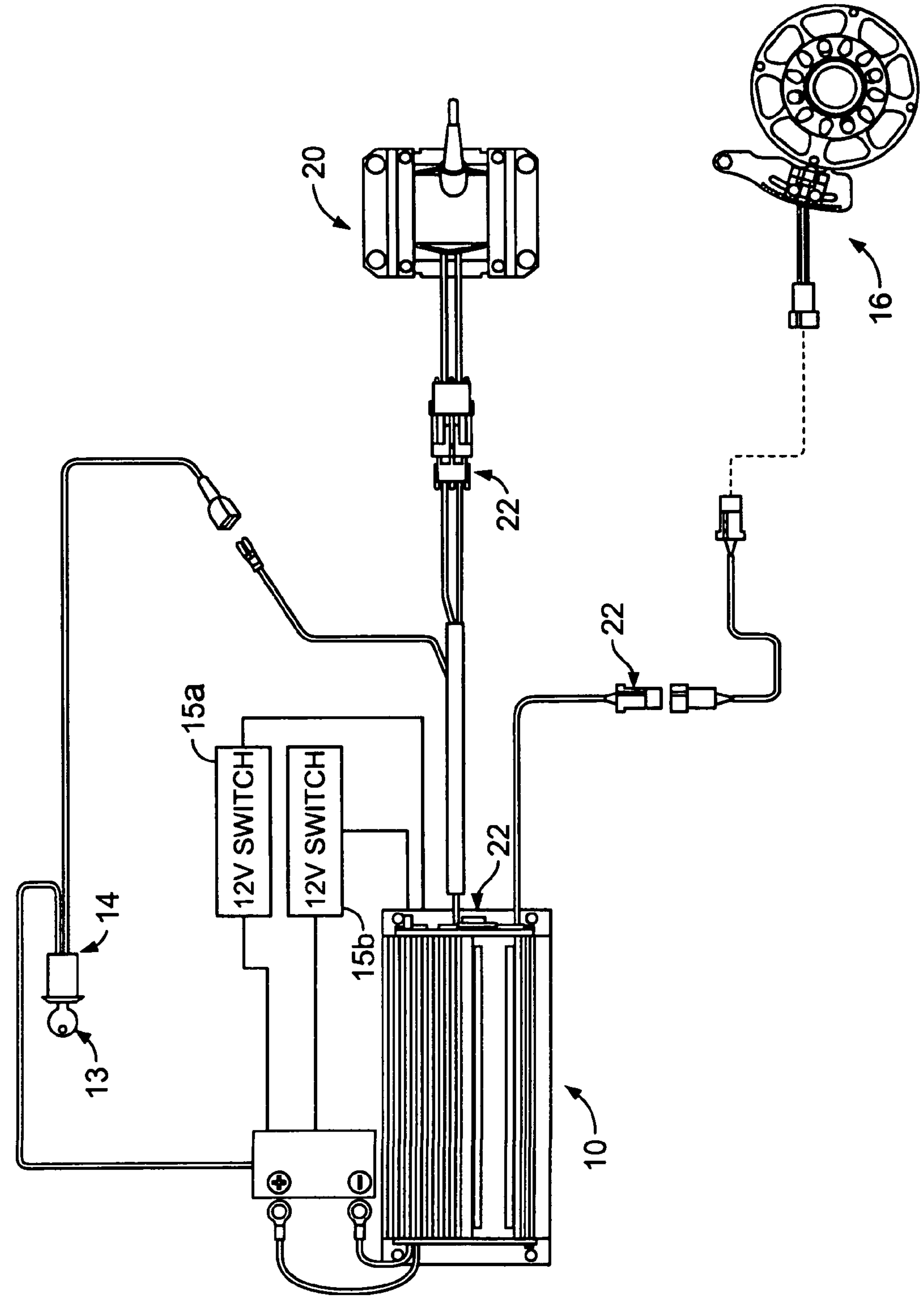
FIG. 1 is a schematic of an ignition control device depicting features of the present invention.

The revlimiter 10 is a multi-function ignition and engine control device. Principally, the revlimiter 10 includes a logic-based microcontroller including a programmable/re-programmable EEPROM for receiving data and/or processor-executable instructions. As can be seen in FIG. 1, the revlimiter 10 is connected to a car battery 12 as a power source and to an ignition switch 14 that is turned by the driver's key 13. The ignition switch 14 is further connected to one or more 12 volt switches 15, the operation of which will be discussed below. The revlimiter 10 may be connected to a number of sensors, including a pickup 16, so that the revlimiter 10 may collect and monitor data regarding a number of parameters of engine operation. Of these parameters, the present invention is most concerned with the cycling of the engine, most commonly described as the revolutions per minute (RPM) of the engine or engine RPM. Accordingly, the pickup 16 is utilized by the revlimiter 10 to monitor and provide information relevant to the engine RPM.

It is well-known in the art to utilize a variety of components for the pickup 16. For instance, a distributor pickup may be used. However, the timing accuracy of a distributor pickup can have less precision than that achieved by other devices. Preferably, the RPM is measured via measuring the rotation of the crankshaft utilizing a pickup 16 in the form of a position-precise crank trigger pickup system. The crank trigger is provided with a sensor located proximate to the path of four magnets located on the crankshaft such that for every 90 degrees rotation of the crankshaft a magnet is registered as passing by the sensor. As the system is intended to monitor the engine to prevent over-revving thereof, it is preferred to measure the revving of the engine in the most proximally located point of the power system of the vehicle. That is, if the engine revving were tracked by monitoring the rotation of the tires, a blown transmission would allow the engine to over-rev while the tires themselves would provide no indication of over-revving because no power would be delivered thereto.

As the revlimiter 10 ultimately is used to control, among other things, the firing of the engine spark plugs, the revlimiter 10 is also connected to coils 20, as is known in the art. It should be noted that the revlimiter 10 may be used with virtually any type of internal combustion engine, and various components that may be selectively included with the vehicle, such as a Nitrous Oxide ($N_2O$) system. As will be discussed below, the operation of the revlimiter 10 is described in terms of controlling the spark to the cylinders in the engine. However, it should be noted that these described operations of the revlimiter 10 are focused on controllably reducing the revving of an engine by stifling the engine when confronted with over-revving due to a lack of resistance on the engine revving. Therefore, as is known in the art, the revlimiter 10 may utilize several methods for reducing engine power by controlling a number of factors that determine or influence the revving of an engine, such as cutting the fuel or air-intake. Controlling the spark is preferred as it is simple and produces immediate results. Accordingly, the engine dumps unburned fuel out of its exhaust system. As the fuel is not burned, there is an immediate drop in RPM during the misfiring, and, without any combustion, the engine is unable to deliver power to the tires via the drivetrain.

As used herein, the term spark misfiring refers to the revlimiter 10, as the ignition control, skipping a spark firing. Typically, significant misfiring is not necessary to reduced the RPM of an over-revving engine. Specifically, most instances of over-revving can be brought under control by a single misfiring, severe cases may require three misfirings, while exceptional cases may require more misfirings. If the tires continue to slip, for instance, the revlimiter 10 may continue to misfire the engine. By way of example, the RPM of a ProStock engine accelerating at 4000 RPM/second may be flattened to 0 RPM/s with a single misfiring.

The revlimiter 10 includes a number of connectable ports 22, including ports provided so that the revlimiter 10 may be programmed and re-programmed, or may download data. The revlimiter 10 may be controlled by a device such as that disclosed in U.S. Pat. No. 6,304,814, which is hereby incorporated by reference in its entirety, may be controlled by the MSD ProData Software available from MSD Ignition of El Paso, Tex., on any computer, or by the 7550 Hand Held Programmer also produced by MSD Ignition.

In one form, the revlimiter 10 detects when the actual measured engine RPM exceeds a predetermined RPM, thereby indicating a loss of traction between the vehicle's tires and the track surface and, accordingly, revlimits or misfires the engine to slow the engine RPM to allow the vehicle to regain traction so the vehicle can be accelerated at a maximum possible rate. That is, the revlimiter 10 is programmable through a course of normal and expected, or abnormal but anticipated, events to specify and limit maximum engine RPM when the instantaneous measured RPM exceeds the predetermined RPM value. More specifically, the revlimiter 10 is programmed to cut the engine spark, thereby cutting engine combustion and reducing engine RPM, when the engine is over-revving. This is referred to as a revlimit and equates to a form of traction control such that the tires receive a maximum forward acceleration while minimizing slip, or loss of traction, conditions.

In a typical drag race, two cars are placed alongside each other in separate lanes of a drag strip race track. There is a start line and a lighting standard, sometimes referred to as a 'Christmas tree,' with a series of lights progressing from yellow to green with green indicating the drivers are permitted to launch their vehicles.

Prior to the race, the drivers perform a burnout. Warm tires tend to grip and adhere to the track better than when cold. Accordingly, as the racers prepare for the race, the tires are warmed by doing a burnout where each car is placed in its lane, and the driver quickly revs the engine to deliberately spin the powered tires against the pavement. The spinning and friction of the burnout causes the tires to heat up. The burnout is often facilitated by placing an amount of fluid on a portion of the track before the start line, the fluid being burnt off by the burnout itself.

Once the tires are warm, the vehicles are carefully positioned at the start line. As the drivers watch the lighting standard, they accelerate the engine to bring the RPM above an idle while holding the vehicle in place. As referred to herein, this is the launch RPM, as distinguished from the idle RPM.

When the green light is given, the vehicle undergoes a launch. That is, immediately prior to the green light, the engine RPM is being held at the launch RPM with the transmission out of gear. On the green light, the driver engages first gear and provides up to the maximum power available, in excess of the launch RPM, from the engine to the tires. This causes a rapid rate of acceleration of the engine. Typically, the time for launch is small, in the order of 0.2 seconds. The driver then proceeds through the gears during the race, which can range from under 6 seconds to 13 seconds, depending on vehicle class and conditions.

Figure 2:
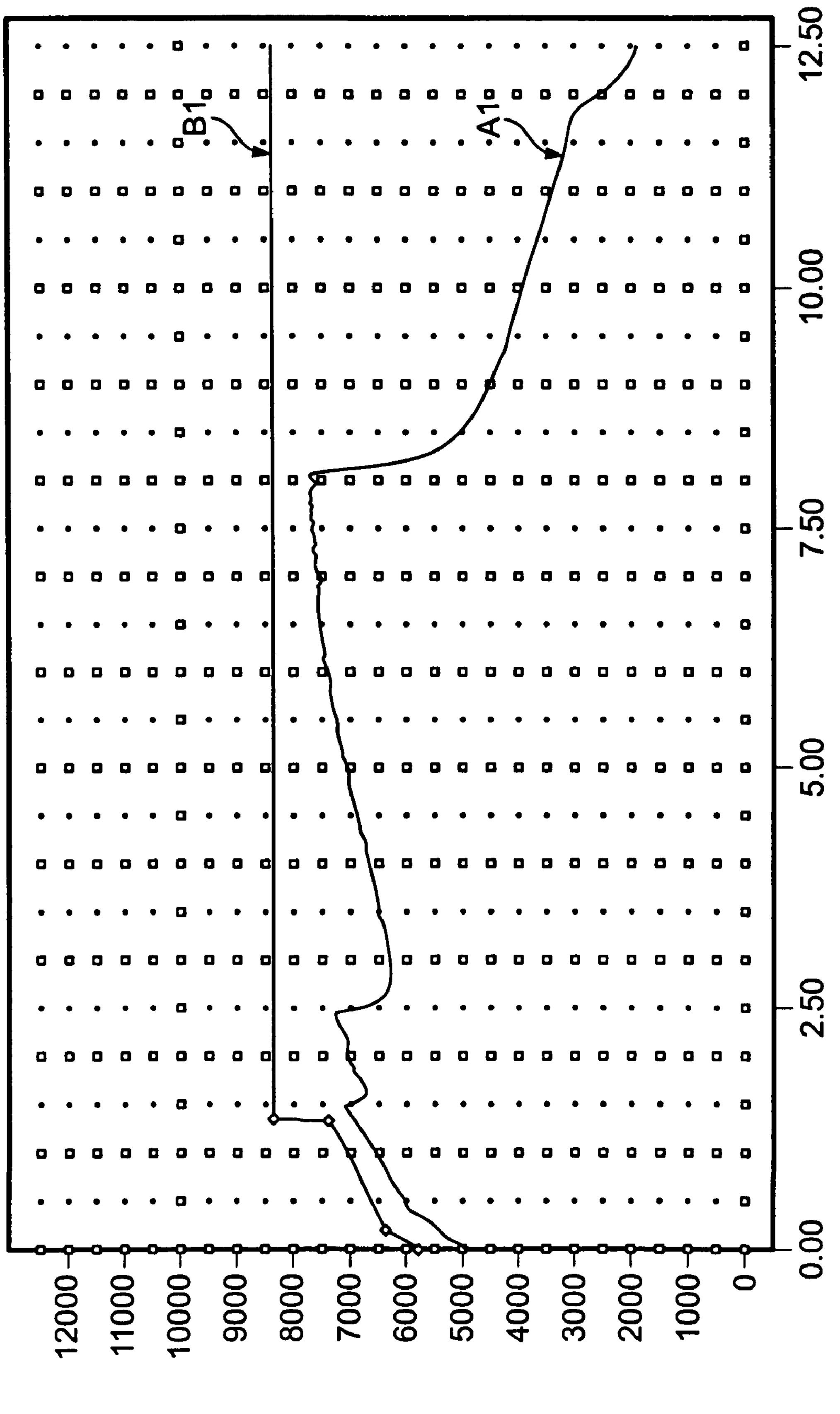
FIG. 2 is a graphical representation of revolutions per minute of an engine versus time displaying a run plot for a particular track run and displaying a programmable RevLimit Curve plot.

As can be seen in FIG. 2, RPM data for a typical track run may be plotted versus time, represented as run plot A1. At time zero, run plot A1 shows the engine at approximately 5000 RPM immediately before launch. The vehicle is then launched, and the RPM rise sharply for the duration of the launch, approximately 0.4 seconds in the illustrated example. The sharp rise in RPM indicates a steep slope, or RPM per second (RPM/s). After the initial launch, the RPM/s continues to rise, though not as sharply as during launch. The slope of the plot in a particular region, such as for launch or for first gear, is the average RPM/s for that region. At about 1.5 seconds, the transmission was shifted from first to second gear, and at other points one can see peaks indicating subsequent gear shifting. As illustrated, the engine RPM initially decreases at each gear shift for a period, only to rise again until the next gear shift. After completing the run, the engine is throttled back so that it can be slowed and stopped. Along each of the portions where the RPM are rising, an average slope can be calculated for that particular portion. The slope defines the average rate of change of the RPM for that region, also known as the acceleration or RPM/s.

The revlimiter 10 is programmed to monitor and control the engine RPM prior to, after, and during each portion of a typical track run. The revlimiter 10 may be solid-state so as to monitor every ignition cycle and control the engine cycle-by-cycle. For instance, the elapsed times may be updated by the sensor 16 every millisecond. As used herein, a cycle refers to the movement of at least one portion of an engine, such as a cylinder, moving away from and back to a specific position. The revlimiter 10 programming fine tunes a vehicle's performance to be calibrated for a specific race track with specific weather conditions. Accordingly, the performance of the vehicle is optimized by performing the programming for each track and for different track conditions. For each stage of a track run, if the measured RPM exceeds the predetermined programmed RPM value, the revlimiter 10 will cut the engine spark in order to reduce the RPM.

As mentioned above, the revlimiter 10 is equipped with one or more 12V switches 15*a* and 15*b*. The switches 15*a*, 15*b* provide a disable signal to the revlimiter 10 for the burnout and the launch, respectively. During the burnout prior to the race, the revlimiter 10 is programmed with a maximum permitted burnout RPM. The default burnout RPM is 7000, and it is user adjustable in 100 RPM increments from 2000 to 12,500 RPM. The disable signal from switch 15*a* during the burnout prevents the revlimiter 10 from cutting spark to the engine during the burnout unless the programmed maximum burnout RPM are exceeded.

Switch 15*b* or another signal may be utilized to indicate to the revlimiter 10 that a launch is occurring, an event where high engine acceleration is expected. The revlimiter 10 is provided with a launch inhibit value, a time value for launch during which the revlimiter 10 is restricted from cutting the engine spark. This time will vary depending on class of vehicle and engine. Accordingly, the launch inhibit value may range from 10 milliseconds to 5 seconds, and the revlimiter 10 may be programmed with 10 millisecond increments. As the engine initially winds up to maximum power delivery, the RPM/s can be high. In some cases, such as for automatic transmissions, the convertor needs to flash up to a lockup RPM or a minimum operating RPM before power is delivered to the vehicle's tires. Accordingly, the launch inhibit value restricts the revlimiter 10 from cutting the engine power during engine wind up and launch. A similar situation may be experienced with turbo-equipped vehicles that need to rev at a certain speed for the turbo to be properly engaged and powered. It should be noted that the revlimiter 10 is restricted, but not prevented, from cutting the engine spark. The revlimiter 10 is, preferably, programmed with a maximum permitted launch RPM. The default launch RPM is 6200 RPM, adjustable in 100 RPM increments from 1000 to 12,500 RPM.

After the launch and prior to the throttle back at the conclusion of the race, the revlimiter 10 provides two approaches for revlimiting the engine. One approach is the RevLimit Curve where a user defines a maximum allowable RPM versus time plot. The other approach is the Slew Rate RevLimiter where initial slew rates are provided for each gear and a target plot is created and calibrated to provide maximum allowable engine RPM. The RevLimit Curve is a static plot based on user defined permissible RPM at a given time, while the Slew Rate RevLimiter utilizes user defined slope values for RPM/s to produce dynamically permissible RPM related to the actual RPM. As used herein, the term slew rate refers to a RPM rate of change of the target or target plot RPM.

Referring again to FIG. 2, a RevLimit Curve is labeled B1 and is plotted without intersecting the run plot A1. As can be seen, the RevLimit Curve B1 provides a launch time of approximately 0.2 seconds. After the launch, the RevLimit Curve B1 provides a rising slope portion for the first gear, which jumps up at approximately 1.4 seconds to approximately 8400 RPM. After 1.4 seconds, the plot is flat through to 12.5 seconds. Because the run plot Al and RevLimit Curve B1 do not intersect in FIG. 2, the RPM limits imposed by the RevLimit Curve B1 do not have any effect on the run that produced run plot A1. The revlimiter 10 allows a user to program up to 32 references or reference points to define specific sections of the RevLimit Curve B1. The user, in essence, selects the slope and timing points for the transitions between, for instance, the launch and the balance of first gear, or between two gears.

Figure 3:
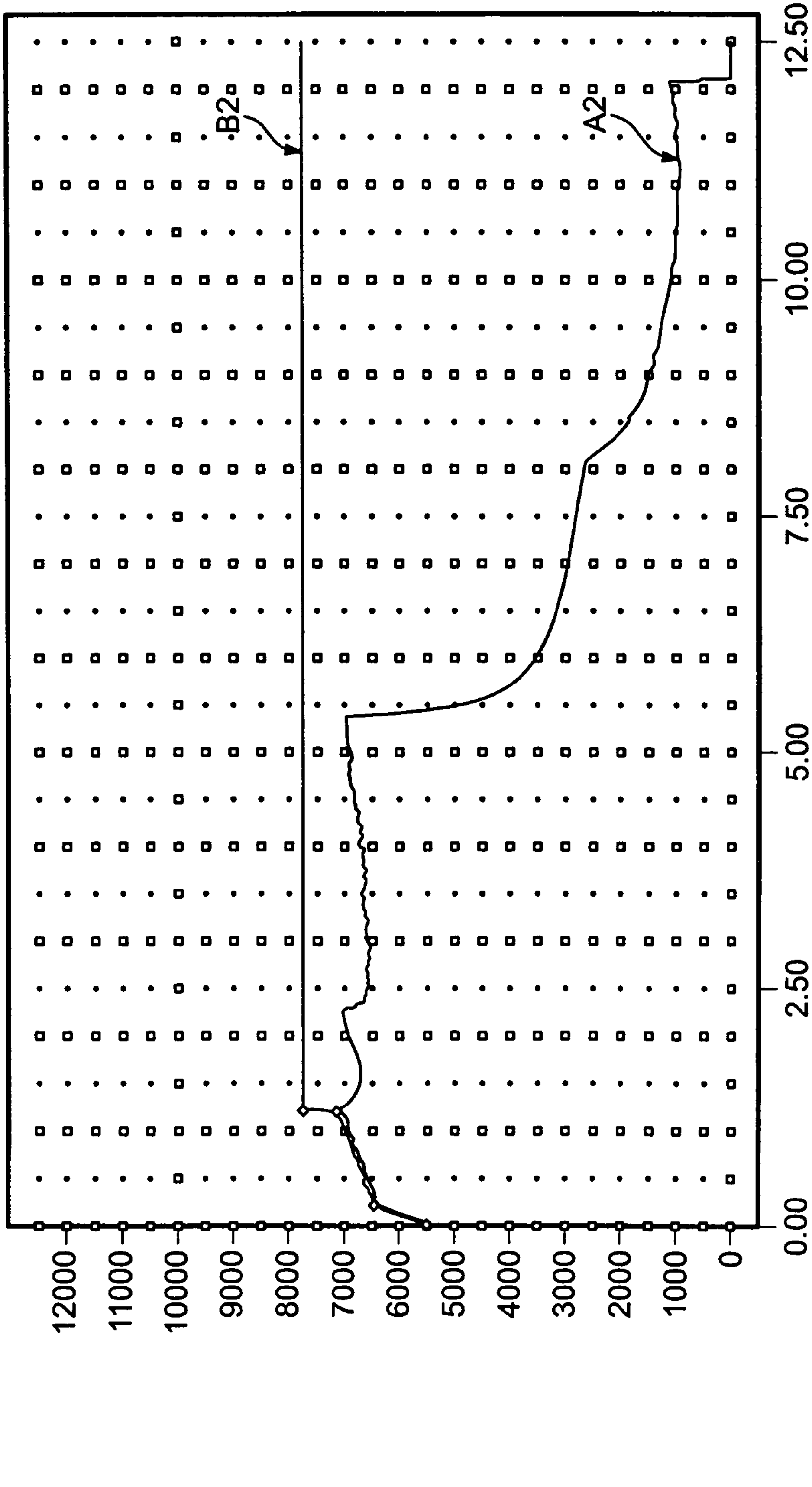
FIG. 3 is a graphical representation of revolutions per minute of an engine versus time displaying a revlimited run plot and displaying the programmable RevLimit Curve plot of FIG. 2.

Turning now to FIG. 3, a RevLimit Curve, labeled as B2, is depicted as intersecting with a run plot labeled A2. The programmed RevLimit Curve B2 defines a plot of RPM values at which the revlimiter 10 will misfire the engine if the measured RPM value for the run plot A2 exceeds the value of the RevLimit Curve B2 at any particular time. The RPM limits imposed by the RevLimit Curve B2 have generally at least a zero slope and have a positive slope in the portions where vehicle is launching or moving through the first gear, as described above. Beyond first gear, the RevLimit Curve B2 is depicted as providing only a maximum RPM value, approximately 7700 RPM as illustrated. If the actual RPM value for the measured run depicted in run plot A2 equals or exceeds the RevLimit Curve B2, the revlimiter 10 cuts the engine spark, as described above, so that the RPM value decreases. After each run, the data measurements from that run may be downloaded and analyzed such that a user may adjust the RevLimit Curve as desired. In addition, the initial RevLimit Curve may be derived by measuring RPM data from a track run. The RevLimit Curve may be adjusted based on an analysis of the measured data from repeated track runs, and the gears may be sequentially programmed in the same manner using track run data.

Figure 4:
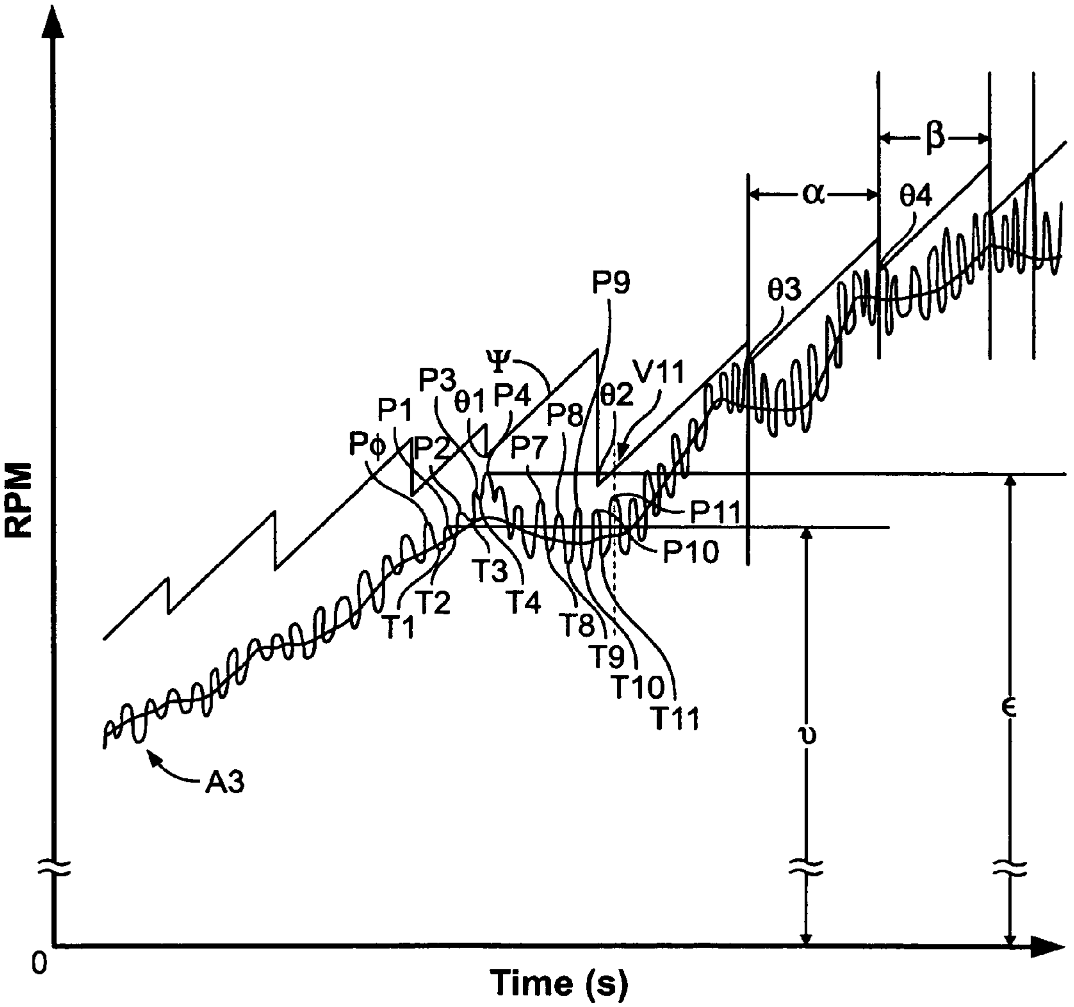
FIG. 4 is a graphical representation of revolutions per minute of an engine versus time displaying a revlimited run plot and displaying a target plot.

The Slew Rate RevLimiter serves to allow a user to define a predetermined target RPM rate of change for individual gears, referred to herein as slew rates. In short, the Slew Rate RevLimiter compares actual measured RPM values to a predetermined RPM target and prompts the revlimiter 10 to cut the engine spark if the actual measured RPM values exceed the predetermined RPM target. As can be seen in FIG. 4, a run plot A3 is depicted in greater resolution than FIGS. 2 and 3 such that the run plot A3 displays a typical ripple or wobble pattern. As the cylinders of an internal combustion engine sequentially fire, each firing causes an impulse exerted on the crankshaft, and each impulse causes vibration and flexing in the crankshaft. Together, these factors are reflected as the wobble in run plot A3 to produce a series of peaks P and troughs T.

Because of this wobble, the actual RPM slope (rate of change, RPM/s) ranges from positive to negative between every cylinder firing. This prevents programmed maximum slew rates (RPM/s values) from being compared directly to a measured acceleration (RPM/s) value. Instead, the measured cycle-to-cycle RPM value of run plot A3 is compared to a predetermined target RPM value. For each track run, the actual RPM value is measured in real-time as the instantaneous RPM. The instantaneous RPM is measured based on the cylinder-to-cylinder, 90 degree rotation of the crankshaft for an eight-cylinder engine, which will display the characteristic wobble discussed above.

After the launch time has concluded, the Slew Rate RevLimiter function is enabled. More specifically, the Slew Rate RevLimiter is inhibited during the launch. Once the launch has concluded, the Slew Rate RevLimiter establishes a reference such as an origin Θ1, a plotted point representing a calculated RPM value versus time at the conclusion of the launch, the calculation of which will be discussed below. Beginning at the origin Θ1, a target plot Ψ of RPM versus time is created as being a straight plot with a rising slope defined by the slew rate for first gear. In other words, the target plot Ψ is an RPM versus time plot provided whose slope is defined by the slew rate and whose beginning position is defined by the origin Θ1.

As discussed above, the measured RPM values (cycle-to-cycle measured speed) for the engine are then compared to the target plot Ψ. Specifically, the measured RPM value at a particular time is compared to a target RPM provided by the target plot Ψ at that particular time. If the actual RPM equals or exceeds the target plot Ψ (in other words, if the actual RPM equals or exceeds the target RPM), the engine is revlimited so that the actual RPM are decreased to return to a point below the target plot Ψ. It is desired for the actual RPM for a particular run to be as close to, without exceeding, the target plot Ψ. Ideally, through empirical testing, the target plot Ψ will be set at the maximum acceleration for the vehicle without slip conditions. The target plot Ψ should be set just above the expected maximum acceleration so that the vehicle is able accelerate under maximum power, and so that the measured RPM exceeds the target RPM when there is a slip condition (or other lack of resistance condition, as discussed above), thereby triggering the revlimiter 10 to cut the engine spark. From the RPM at an origin Θ, elapsed time from each origin Θ, and the programmed slew rate for the particular gear, the revlimiter 10 derives the target plot Ψ and the target RPM for the elapsed time from each origin Θ.

As discussed, the Slew Rate RevLimiter is programmed with a maximum slew rate (RPM/s) value for each gear, a value that provides the slope (rate of RPM change) for a plot of RPM versus time, referred to herein as the target plot Ψ. The initial set of maximum slew rate values may be provided in several manners. For example, the initial set of slew rate values is programmed, either by a user or by the defaults of the Slew Rate RevLimiter. The slew rates may be programmed to range from 100 RPM/s to 9900 RPM/s, and typical default slew rates are set at 6200 RPM/s for gear 1, at 3200 RPM/s for gear 2, at 1900 RPM/s for gear 3, at 1400 RPM/s for gear 4, at 1200 RPM/s for gear 5, and at 1000 RPM/s for gear 6.

Alternatively, these values may be initially programmed based on measured and collected RPM data from an initial test run. Approximate slopes can be derived from the data, or from a plot of the data, for each gear, each portion of the run, or segments of particular gears. For the test run, the revlimiter 10 may be disabled so that it does not revlimit the engine, or the revlimiter 10 may use a RevLimit Curve, discussed above, to place at least some restriction to prevent engine damage from excessive engine revving while minimizing the impact on the initial set of data. In order to calibrate the Slew Rate RevLimiter, a user may adjust the slew rates based upon empirically determined data from track runs. It should be noted that a driver may make a number of test runs where the data is collected, and the initial set of slew rates may be selectively derived from one or more of these runs.

The target plot Ψ or plots has portions, each portion having a slope provided by the programmed slew rate. The positioning of the target plot Ψ portions is provided by the calculated origin points, such as Θ1, Θ2, Θ3, in terms of RPM value. The RPM value at an origin is calculated based on a four-cycle average of the actual RPM data, abbreviated here as the FCAARPM, when the origin is set by the Slew Rate RevLimiter. More specifically, the RPM value at an origin Θ is defined as the sum of the FCAARPM, a Margin Value, and an RPM Difference Value, as will be discussed below.

The target plot Ψ or plots are positioned to avoid normal RPM wobble to activate the RPM revlimiter 10 while also avoiding rapid engine acceleration above the expected rate to continue long enough to cause excessive tire slippage. At each origin Θ, the difference between the origin Θ RPM value and actual RPM generally accounts for the engine wobble.

One component of the difference between the origin Θ and actual RPM values at an origin Θ is the Margin Value. Programmed by the user, the Margin Value at any particular point is based on a margin plot or function. More specifically, low and high RPM margins are either preprogrammed or adjustably programmed by a user. The low RPM margin is the amount of margin RPM provided at the lowest expected RPM, typically zero RPM, while the high RPM margin is the RPM margin provided at the maximum expected RPM, such as, for example, 12,500 RPM. The margin is set over the entire range of expected RPM, such as 0–12,500, and the margin values between the maximum and minimum are interpolated between the provided high and low RPM margins. The margin function may be linear, quadratic, or any other function or combination thereof, and may include separate and/or multiple functions or plots for each individual gear, or periods of time, or for speeds. In general, the margin at any given point ranges from 100 to 990 RPM, and typical values would be 200 RPM and 400 RPM for the low and high RPM margins, respectively, and otherwise would be typically 100 to 200 RPM in difference, but may be the same value.

A second component of the difference between the origin Θ and actual RPM values at an origin Θ is the RPM Difference Value. More specifically, the RPM Difference Value is calculated by first determining a maximum peak RPM value and a minimum peak RPM value for a historical four-cycle period, and then halving the difference between that maximum peak RPM value and minimum peak RPM value. Referring again to FIG. 4, peaks Pø, P1, P2, P3, and P4 and troughs T1, T2, T3, and T4 are intersticed and are representatively selected as a historical four-cycle period. Each trough and peak has a specific and particular actual RPM value. The maximum peak RPM value is the value at the highest peak of the four-cycle period (Pø, P1, P2, P3, P4), which is seen in FIG. 4 as the RPM value at peak P4 and is represented as ∈. The minimum peak RPM value is the value at the lowest peak of the four-cycle period (again, Pø, P1, P2, P3, P4), which is seen in FIG. 4 as the RPM value at P1 and is represented as υ. Therefore, for the actual RPM at the point represented by peak P4, the RPM Difference Value is the based on the RPM values at peak P1 and peak P4, and is calculated as $(½)\cdot|\in-\upsilon|$. Accordingly, an RPM value at origin Θ1 corresponding to peak P4 equals (FCAARPM)+(RPM Difference Value $(½)\cdot|\in-\upsilon|$)+(Margin Value). From the origin Θ1, the target plot Ψ increases at the slew rate for that gear.

The run plot A3 further has peaks P7, P8, P9, P10, and P11 and troughs T8, T9, T10, and T11 intersticed and representatively selected. At each peak, there is a corresponding target value V, such as V11 corresponding to peak P11, defined by the target plot Ψ. If the RPM value for the peak equals or exceeds the target value, the revlimiter 10 the revlimiter 10 perceives this as an over-revving engine and is activated to misfire the engine. Therefore, the revlimiter 10 cuts the engine spark to reduce engine RPM. Regardless of the actual RPM sharply increasing from trough to peak, or decreasing from peak to trough, the target plot Ψ does not increase based on the increase in the actual RPM, instead increasing based on the programmed slew rate for that particular gear.

If the engine RPM measured at a particular time is significantly below the target plot Ψ, the target plot Ψ may be repositioned by the Slew Rate RevLimiter at a lower point. More specifically, a Temporary Value is calculated for every ignition cycle in the same manner that the origin Θ is calculated. If the Temporary Value for the measured engine RPM for a particular time is below the target RPM defined at that particular time by the target plot Ψ, the Slew Rate RevLimiter sets a newly calculated origin, such as Θ2, and the target plot Ψ increases from origin Θ2 at the slew rate (slope) for that particular gear. It should be noted that a newly calculated origin Θ for the target plot Ψ is never repositioned higher by the Slew Rate RevLimiter, and the target plot Ψ only increases based on the slew rate for that gear.

As stated, a Temporary Value is calculated for every ignition cycle. Specifically, the actual RPM is measured at each cycle. For each actual RPM value, a target value is determined based on the target plot Ψ, and the revlimiter 10 misfires the engine if the actual RPM value equals or exceeds the target value. The Temporary Value is calculated from each actual RPM value, and the Temporary Value is calculated as the sum of the FCAARPM, the Margin Value, and the RPM Difference Value, as discussed above for the origin Θ. A comparison is then made between the Temporary Value and the target value. If the Temporary Value is below the target value, the Temporary Value is set as a new origin Θ, such as Θ4, and the subsequent portion of the target plot Ψ is positioned downward starting from that origin Θ4 and rising at the slew rate (slope) for that gear, as is depicted by target plot portions α and β in FIG. 4. It should again be noted that the origins Θ for target plot Ψ sections are not repositioned upward by the revlimiter 10, as discussed above. It should also be noted that the measurement of the actual RPM, the calculation of the Temporary Value, the positioning and increase of RPM value for the target plot Ψ, the comparison between the actual RPM and the target value, and the comparison between the Temporary Value and the target value are each done in real-time. Accordingly, it should be clear that the revlimiter 10 cuts the engine spark when the actual RPM exceeds the target value of the target plot Ψ, not simply because the actual RPM/s (rate of change) exceeds the programmed slew rates.

It should be noted that serial running of the vehicle on the track can also help establish the proper Margin Values. That is, if the data indicates that the revlimiter 10 did not act to cut engine power, yet the car is known to have not performed well because of slip conditions, then the Margin Value is likely too high. Conversely, if the engine cannot wind up and go full throttle because the revlimiter 10 repeatedly cuts the engine power, and the track and environmental conditions are favorable, then the Margin Value is likely too low. Accordingly, the data should be examined in considering whether the selected Margin Values are proper. It should also be noted that the interpolation of Margin Values between the high and low margins need not be linear, instead being dictated by a function that more closely describes the change in magnitude of the described engine wobble through the range of maximum and minimum expected RPM values, as discussed above.

Optimally, the Margin Value is set as low as possible to minimize the difference between the target plot Ψ and the actual RPM plot for a particular run where no slip condition is experienced. The target plot Ψ may be calibrated over repeated runs. Ideally, the target plot Ψ has a slope equal to the average RPM increase from peak to peak of the actual RPM while having a position just slightly above the peaks of the actual RPM when no over-rev or slip condition is experienced, and the Margin Value is calibrated to account simply for the cylinder-to-cylinder engine RPM wobble. When such a target plot Ψ is arrived at, any slip condition or over-revving would immediately be recognized as such by the revlimiter 10, which would then act to eliminate the issue, as described below. However, in practice the ideal is typically unattainable, and the target plot Ψ should simply track closely the peaks of the actual RPM plot, as described.

By reviewing the data from one or more runs, a user may determine slew rates empirically. For instance, after a first run, slew rates may be programmed and a second run performed. An analysis of the data will show how many times the revlimiter 10 was activated. If the revlimiter 10 was not activated, the programmed slew rate and/or Margin Value is probably too high. Conversely, if the revlimiter 10 activated a significant number of times, the slew rate and/or Margin Value is probably too low. If the revlimiter 10 is activated only a few times, the slew rates and Margin Value are considered sufficiently calibrated.

As mentioned, a separate slew rate may be provided for each gear. At the point of shifting, the revlimit 10 recognizes that a different slew rate is to be utilized, and the target plot Ψ is adjusted accordingly. By manner of example, the revlimiter 10 may recognize that a shift has occurred by being notified by a sensor or switch (not shown) in the shift system or transmission, or, alternatively, will recognize a predetermined drop in RPM as indicating a gear shift. For instance, if the RPM drops 600 RPM, the revlimiter 10 may be programmed to assume a gear shift has occurred. Preferably, the RPM drop is programmable between 200 and 1500 RPM in 100 RPM increments.

As mentioned, the target plot Ψ may be adjusted downward when a new origin Θ is set during a run. However, in the event of a slip condition which activates the revlimiter 10 to cut the spark to the engine, the RPM drop is often greater than necessary to reduce the actual RPM to a level below the target plot Ψ. More specifically, the RPM are cut a sufficient amount to permit the vehicle to regain traction. During this drop, a setting of a new origin Θ and re-positioning of the target plot Ψ to a lower position would cause the target values of the target plot Ψ to be too low, and the engine would be prevented from delivering the maximum power possible without slip conditions. Therefore, it is preferred that the target plot Ψ is not positioned due to a drop in actual RPM that is a result of revlimiting.

Accordingly, the revlimiter 10 is provided with a hold count value. The hold count value is a counter that prevents readjustment of the target plot Ψ due to a spark cut by delaying any repositioning of the target plot Ψ for the specified hold count value. For engines that rev 7000–8000 RPM, a typical hold count value is 10 cycles, and a ProStock engine is likely to be 12 cycles or higher. For an 8 cylinder engine, a cycle is every 90 degrees rotation of the crankshaft. In any event, the data should be examined on a vehicle to vehicle basis to determine if the hold count value was properly selected. For the range of vehicles utilizing such a device, the hold count value may be programmed between 1–99, while 5–20 is believed to be the most effective range. During the hold count, the RPM slope may go negative and return to positive before the revlimiter 10 is able to reposition the target plot Ψ. The hold count begins and is reset at each revlimit or misfire. Accordingly, the hold count begins on the first misfire and counts until the count has been completed. If the revlimiter 10 skips more than one spark, each missed spark causes the hold count to restart and begin counting at zero.

As a safety precaution, the revlimiter 10 can be programmed to shut down the engine, or reduce its RPM to a desired level such as 2000 RPM, after a set period of time such as the expected run time. In general, the length of the drag race track defines an expected time for a run. For instance, a drag race track may be a quarter-mile stretch, generally straight, that is covered in around 8 seconds. This time will vary depending on vehicle and engine class, and is used in an exemplary manner only. There are times when the driver is unable to throttle back after a run is complete. This may be because the throttle has become stuck open, or something has broken. Unfortunately, this may also be because the driver has become incapacitated or otherwise incapable of reducing the fuel supply. In the case where a run is expected to be completed in 8 seconds, the engine may be cut by the revlimiter 10 at 8 seconds or shortly thereafter.

As the engine nears or hits the maximum RPM for a gear, the driver may be provided with an indication that the transmission should be shifted. If the gear is not shifted, the RPM may reach the RevLimit Curve (defining a maximum RPM value for the gear) or another programmed RPM limit, in which case the revlimiter 10 may stifle the engine by cutting the spark.

In the event the revlimiter 10 is activated to cut the spark at the time of a gear shift, the hold count is delayed until the RPM target is repositioned for the new gear. As discussed, the hold count impedes the repositioning of the target due to a drop in RPM due to a revlimit. The hold count should be sufficient long in duration such that the target is not improperly repositioned at an artificially low level, which over-impedes the engine power, but should be sufficiently short such that the revlimiter 10 is not responsive after a gear shift.

While the invention has been described with respect to specific examples including presently preferred modes of carrying out the invention, those skilled in the art will appreciate that there are numerous variations and permutations of the above described systems and techniques that fall within the spirit and scope of the invention as set forth in the appended claims.

What is claimed is:

1. A method for optimizing power delivery from an engine, the method including the steps of:

providing a predetermined maximum allowable revolutions per minute function for time from a reference;

tracking a time from the reference;

measuring the revolutions per minute of the engine at a particular time from the reference;

comparing the measured revolutions per minute of the engine at the particular time from the reference to the maximum allowable revolutions per minute value provided for the particular time; and decreasing power from the engine when the measured revolutions per minute of the engine equals or exceeds the provided maximum allowable revolutions per minute value for the particular time.

2. The method of claim 1 wherein the step of comparing is performed at least every engine cycle.

3. The method of claim 1 wherein the method further includes providing the reference.

4. The method of claim 1 wherein the step of providing a maximum allowable revolutions per minute value includes providing a plurality of values at respective times from the reference.

5. The method of claim 4 wherein the method includes interpolating values between the respective times.

6. The method of claim 1 wherein the step of providing a maximum allowable revolutions per minute value includes specifying a time-based function for the value.

7. The method of claim 6 wherein the step of providing a function includes varying the value linearly from a beginning to an end of a time period.

8. The method of claim 1 wherein the step of providing a maximum allowable revolutions per minute value includes providing at least one time-based function where each function provides values for an expected engine condition.

9. The method of claim 8 wherein the expected engine condition is selected from the group of period of burnout, period of launch, period of an engine gear, or period after conclusion of a race.

10. The method of claim 1 wherein the step of providing a maximum allowable revolutions per minute value includes specifying at least two times from the reference with respective revolutions per minute values, and includes interpolating revolutions per minute values for times between each specified time from the reference.

11. The method of claim 1 wherein the step of providing a maximum allowable revolutions per minute value includes providing a constant value for at least one specified time period.

12. A method for optimizing power delivery from an engine, the method including the steps of:

providing at least one predetermined maximum allowable revolutions per minute rate of change;

providing a permitted target revolutions per minute value for a specific time;

increasing the permitted target revolutions per minute value at the predetermined maximum allowable revolutions per minute rate of change;

measuring the revolutions per minute of an engine for at least one subsequent time;

comparing the revolutions per minute of the engine for the subsequent time to the permitted target revolutions per minute value for the subsequent time; and decreasing power from the engine when the revolutions per minute of the engine equals or exceeds the permitted target revolutions per minute value for the subsequent time.

13. The method of claim 12 wherein the step of measuring the revolutions includes measuring the cylinder-to-cylinder rotation of a crankshaft.

14. The method of claim 13 wherein the step of measuring the rotation of the crankshaft includes providing a crank trigger pickup for measuring the rotation of the crankshaft.

15. The method of claim 12 wherein the step of providing a rate of change includes providing at least one function for calculating the rate of change.

16. The method of claim 15 wherein the step of providing at least one function includes providing at least one linear function.

17. The method of claim 15 wherein the step of providing a function includes providing a plurality functions for different transmission gears.

18. The method of claim 15 wherein the step of providing a function includes providing a plurality of functions for different speeds.

19. The method claim 12 wherein the step of providing permitted target revolutions per minute value at the specific time includes calculating the provided permitted target revolutions per minute value at the specific time from a measured revolutions per minute of the engine value at that specific time.

20. The method of claim 19 wherein the step of calculating includes adding a factor to the measured revolutions per minute of the engine value.

21. The method of claim 20 wherein the step of adding the factor includes adding a margin value.

22. The method of claim 21 wherein the step of adding the margin value includes calculating the margin value.

23. The method of claim 22 wherein the step of calculating the margin value includes interpolating a value between at least two predetermined values.

24. The method of claim 22 wherein the step of calculating the margin value includes calculating a value based on a function.

25. The method of claim 20 wherein the step of adding the factor includes adding a RPM difference value based on a four-cycle historical RPM values for the engine.

26. The method of claim 19 further including:

calculating a temporary value for measured revolutions per minute of the engine values at times subsequent to the specific time;

comparing the temporary value to the permitted target revolutions per minute value at each subsequent time;

setting a new permitted target revolutions per minute value for each subsequent time when the temporary value is lower than the permitted target revolutions per minute value; and increasing the permitted target revolutions per minute value at the predetermined maximum allowable revolutions per minute rate of change.

27. The method of claim 26 wherein the steps are repeated continuously.

28. The method of claim 26 wherein the steps are repeated every engine cycle.

29. The method of claim 12 further including a step of providing a hold after the decreasing of the engine power during which a new permitted target revolutions per minute value is not provided regardless of whether the temporary value at that time is less than the permitted target revolutions per minute value at that time.

30. A method for preventing loss of traction between tires of a vehicle and a road, the steps including:

providing a permitted target revolutions per minute value for a specific time wherein the permitted target revolutions per minute value increases at a predetermined revolutions per minute versus time rate;

providing a plot of predetermined maximum allowable revolutions per minute versus time from a reference;

measuring the revolutions per minute of an engine for at least one time subsequent to the reference;

comparing the revolutions per minute of the engine for the time subsequent to the reference to a value determined from the plot for the time subsequent;

if the time subsequent to the reference is also subsequent to the specific time, comparing the revolutions per minute of the engine for the time subsequent to the permitted target revolutions per minute value for the subsequent time;

decreasing power from the engine when the revolutions per minute of the engine equals or exceeds the permitted target revolutions per minute value for the subsequent time; and decreasing power from the engine when the revolutions per minute of the engine equals or exceeds the provided maximum allowable revolutions per minute value for the particular time.

* * * * *